United States Patent [19]

Kudo

[11] Patent Number: 4,754,289
[45] Date of Patent: Jun. 28, 1988

[54] TWO-DIMENSIONAL INK DROP SHADOW POSITION DETECTING APPARATUS

[75] Inventor: Osami Kudo, Kanagawa, Japan
[73] Assignee: Fuji Xerox Co., Ltd., Tokyo, Japan
[21] Appl. No.: 883,771
[22] Filed: Jul. 9, 1986
[30] Foreign Application Priority Data Oct. 4, 1985 [JP] Japan .................................. 60-221189

[51] Int. Cl.⁴ ........................ G01D 15/18; G02E 5/14
[52] U.S. Cl. .................................. 346/75; 346/140 R; 250/227
[58] Field of Search .............. 346/75, 140 R; 250/227

[56] References Cited

U.S. PATENT DOCUMENTS 4,344,078 8/1982 Houston .................................. 346/75
4,392,142 7/1983 Seachman et al. .................... 346/1.1
4,550,322 10/1985 Tamai .................................... 346/75

Primary Examiner—E. A. Goldberg
Assistant Examiner—Gerald E. Preston
Attorney, Agent, or Firm—Gerald J. Ferguson, Jr.

[57] ABSTRACT

A two-dimensional position detecting apparatus for ink drops is disclosed including a light source and a pair of photodetectors disposed in a detecting region so that the pair of photodetectors respectively produce electrical signals in accordance with a flying position of the ink drops in the detecting region, and a signal processor for detecting a horizontal position of the ink drops on the basis of a difference in an output signal between the photodetectors and for detecting a vertical position of the same ink drops on the basis of the sum of the respective output signals of the pair of photodetectors.

7 Claims, 4 Drawing Sheets

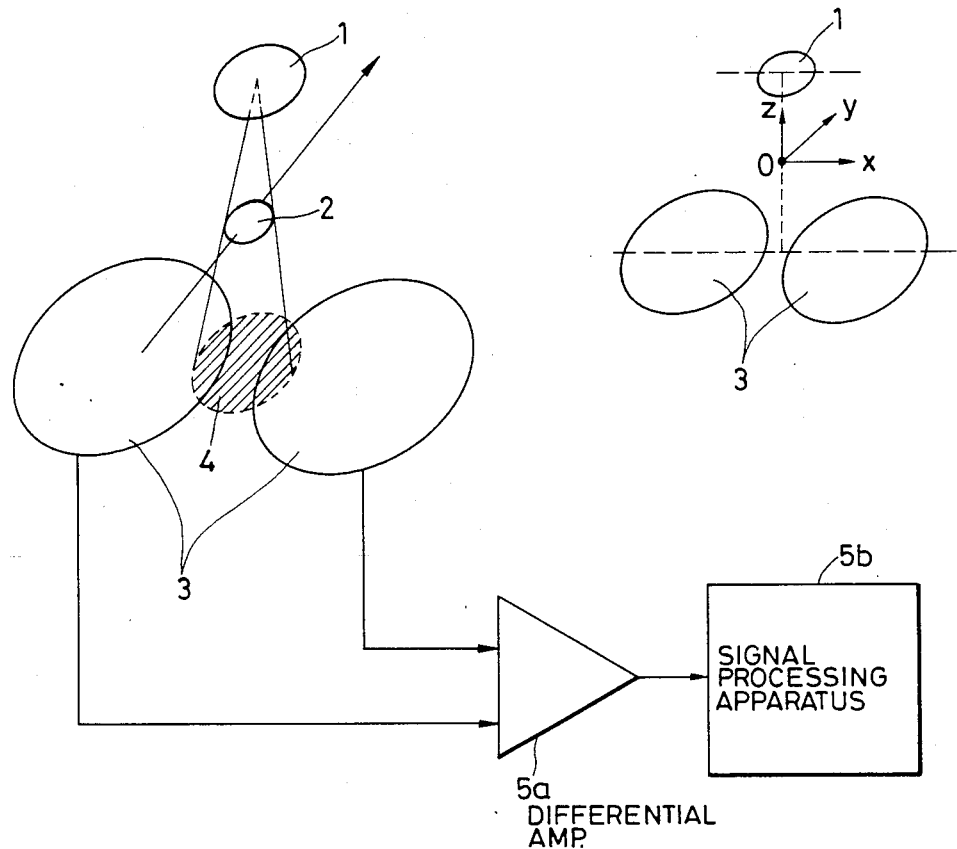
FIG. 4
FIG. 5
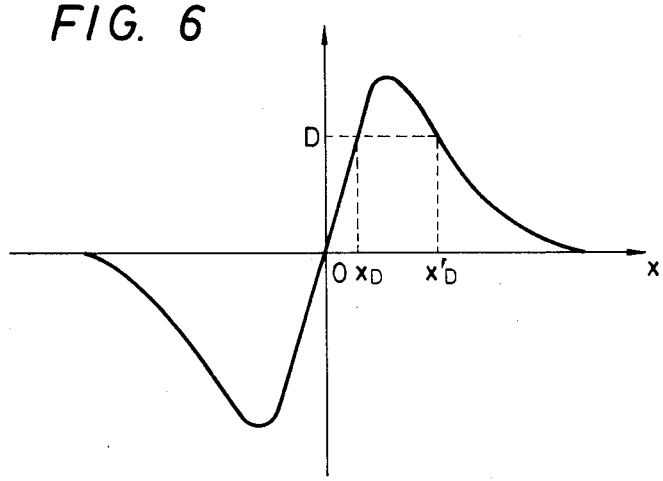
FIG. 6

TWO-DIMENSIONAL INK DROP SHADOW POSITION DETECTING APPARATUS

BACKGROUND OF THE INVENTION

1. Field of the Invention

The present invention relates to a two-dimensional position detecting apparatus for ink drops in an ink jet system recording apparatus.

2. Description of the Prior Art

In an ink jet system recording apparatus of the multi-nozzle type, as shown in FIG. 3, it is necessary to perform such a switching operation that the respective ends of printing regions 13 and 14 assigned by nozzles (in the drawings, an example provided with two nozzles 11 and 12 is shown) are made to agree with each other at a boundary or stitching point 15 between the regions 13 and 14 on a surface of paper 10. If this stitching operation is not performed in the optimum manner, overlapped printing or blank portions may be produced. Therefore, in the ink jet system recording apparatus of the multi-nozzle type, the position of an ink drop 16 to be printed by an ink drop 16 at the stitching point 15 is detected by an ink-drop position detector or an ink-drop sensor to thereby perform position control of the ink drops 16.

As the conventional position detecting sensor, there have been proposed such sensors as are disclosed, for example, in Japanese Patent Application (OPI) Nos. 118870/1980 and 125408/1980 (the term "OPI" as used herein means an "unexamined published application"). A brief description will be given as to the arrangement of the sensor disclosed in Japanese Patent Application (OPI) No. 125408/1980. In this sensor, an ink-drop detecting region is defined in a space between one end surface of an input fiber and respective one end surfaces of two output fibers for each of the detecting sites, and an LED light source is connected to the other end of the input fiber while two photosensors are connected to the other ends of the output fibers, respectively.

In this arrangement, when an ink drop comes in a region between the input and output fibers, respective outputs of the two photosensors vary with the lapse of time, so that the passing of an ink drop through the detecting site is indicated by a detecting circuit connected to the photosensors.

In the conventional position detecting apparatus for ink drops, however, it is required to provide a detecting unit constituted by a light source and a pair of detectors or photosensors in order to detect a linear or one-dimensional position of an ink drop, and therefore it is necessary to provide two sets of the same detecting units in order to detect a two-dimensional position of an ink drop, the two-dimensional position detection being required for performing high-quality printing. Consequently, there have been such disadvantages that the number of parts of the position detecting apparatus is necessarily increased, and that it is difficult to set the position detecting apparatus in a narrow space and to define the paths for the position detection.

SUMMARY OF THE INVENTION

An object of the present invention is to eliminate the foregoing disadvantages of the prior art.

Another object of the present invention is to provide a two-dimensional position detecting apparatus for ink drops, in which it is possible to detect a two-dimensional position of inks drops by using a single detecting unit.

In order to attain the above-mentioned objects, the two-dimensional position detecting apparatus for ink drops according to the present invention comprises a light source and a pair of photodetectors disposed in a detecting region so that the pair of photodetectors respectively produce electrical signals in accordance with a flying position of the ink drops in the detecting region, and signal processing means for detecting a horizontal position of the ink drops on the basis of a difference in an output signal between the photodetectors and for detecting a vertical position of the same ink drops on the basis of the sum of the respective output signals of the pair of photodetectors.

The above objects, features, and advantages of the present invention will be apparent from the following detailed description taken in conjunction with the accompanying drawings.

BRIEF DESCRIPTION OF THE DRAWINGS

FIG. 4 is a block diagram for explaining the principle of the ink drop sensor;

FIG. 5 is a diagram for explaining the coordinate system for an ink drop;

FIG. 6 is a characteristic diagram showing the relationship between X-coordinate of a crossing point of a plane including a light source and respective centers of a pair of photodetectors and a lucus of movement of an ink drop and a difference between respective outputs of the detector pair;

DETAILED DESCRIPTION OF THE PREFERRED EMBODIMENT

Figure 1:
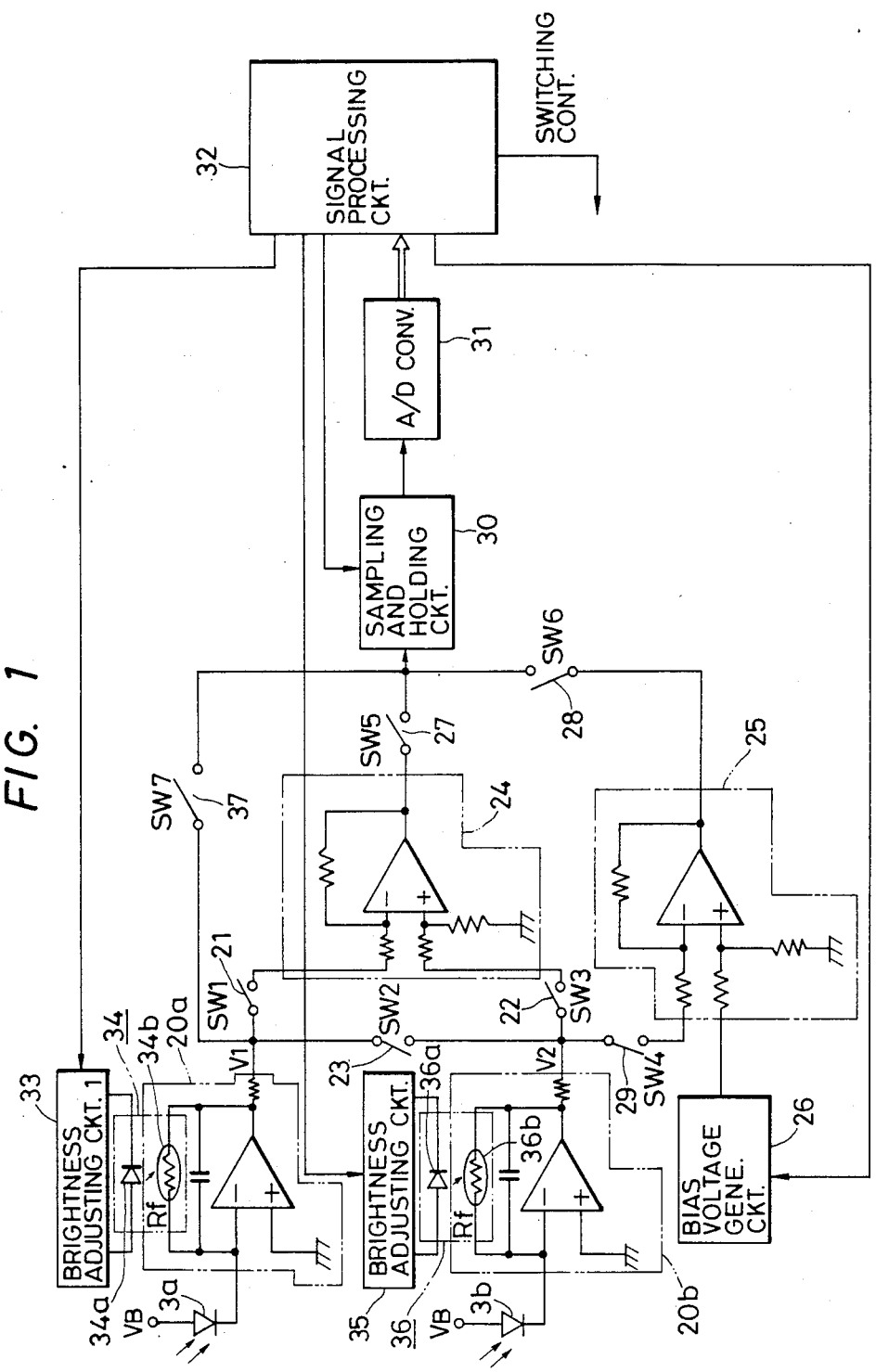
FIG. 1 is a block diagram showing an embodiment according to the present invention.

The two-dimensional position detecting apparatus for ink drops according to the present invention now will be described in detail.

Prior to the description of a preferred embodiment of the present invention, the principle of ink-drop position detection according to the invention will be described with reference to FIG. 4 for the sake of better understanding of the invention.

In an ink-drop sensor, in FIG. 4, a detecting unit is constituted by a light source 1 and a pair of photodetectors 3 which have the same arrangement with each other and are disposed adjacent to each other, thereby detecting the position of an ink drop 2 passing over the pair of photodetectors 3. When the ink drop 2 passes between the light source 1 and each of the pair of photodetectors 3, a shadow 4 of the ink drop 2 is cast partly on the pair of photodetectors 3. At this time, the respective output levels of the detector pair 3 are reduced corresponding to the shadowed areas on the respective photodetectors 3 due to the shadow 4, and each of the amounts of reduction in output level is obtained by integrating a contribution by the shadow 4 which changes as the ink drop 2 passes with the lapse of time. After these amounts have been electrically detected, a difference in output between the pair of photodetectors 3 is obtained by a differential amplifier 5a, and the position of the ink drop 2 is measured by a signal processing apparatus 5b on the basis of the output of the differential amplifier 5a.

An origin of coordinates is defined at a middle point of a segment between the center of the light source 1 and the center between the pair of photodetectors 3, an X-axis is defined in parallel to a straight line passing through the respective centers of the pair of photodetectors 3, and a Y- and a Z- axis is defined as shown in FIG. 5.

Figure 7:
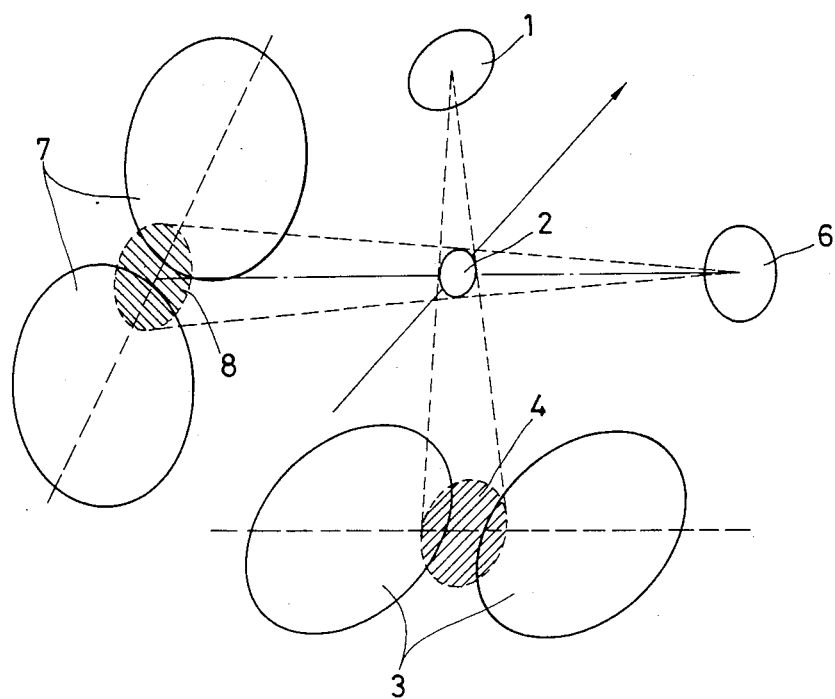
FIG. 7 is a diagram for explaining the principle of the conventional two-dimensional position detection.

FIG. 6 shows the relationship between X-coordinate of a crossing point of a plane including a light source and respective centers of a pair of photodetectors and a locus of movement of an ink drop and a difference between the respective outputs of the pair of photodetectors 3. Therefore, it is possible to detect the passing position XD(or X'D) of the ink drop 2 in the direction along the X-axis (hereinafter simply referred to as "X-direction") using the output difference D between the pair of photodetectors 3 while the ink drop 2 passes through the detecting region of this detecting unit. Thus, the passing positions of the ink drop 2 in the X-direction can be obtained. Similarly thereto, if it is required to detect the passing position of the ink drop 2 in the Z-direction, it will suffice to provide another detecting unit as shown in FIG. 7 which shows an arrangement of the conventional two-dimensional position detecting apparatus. However, in the conventional apparatus, there have been disadvantages because two sets of detecting units are used, as described above.

In FIG. 7, the reference numerals 6 and 7 designate a light source and a pair of photodetectors, respectively, for the detection of the Z-coordinate, and a 8 represents a shadow caused by the ink drop 2 and cast on the pair of photodetectors 7.

Figure 8:
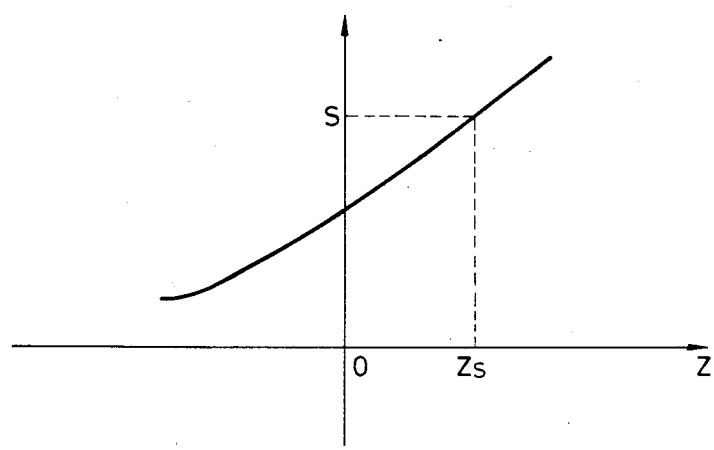
FIG. 8 is a characteristic diagram showing changes in the amount of reduction in the sum of outputs of the detector pair along the direction of the Z-axis.

In order to eliminate such disadvantages as described above, according to the present invention, the sum of the outputs of a pair of photodetectors is measured to thereby detect the passing position of an ink drop in the Z-direction. The sum of the outputs from the pair of photodetectors is reduced corresponding to the respective shadowed areas, on the pair of photodetectors, formed when the ink drop passes over the detecting unit, and this amount of reduction varies depending upon the height of the passing position in the Z-direction, as shown in FIG. 8. Therefore, if the amount of reduction in the sum of the respective outputs of the pair of photodetectors can be detected, it is possible to detect the passing position Z of the ink drop in the Z-direction.

FIG. 1 shows an embodiment according to the present invention. In the drawing, the apparatus of this embodiment is constituted by: a pair of photodetectors 3a and 3b constituting a detector unit 3; a pair of current-to-voltage (hereinafter abbreviated to "I/V") conversion circuits 20a and 20b for converting the photocurrents produced by the pair of detectors 3a and 3b into voltages respectively; a pair of switches 21 (SW$_1$) and 22 (SW$_3$) for selectively transferring the respective output voltages of the circuits 20a and 20b to a succeeding circuit portion; a switch 23 (SW$_2$) for shorting across the respective output terminals of the I/V conversion circuits 20a and 20b; a differential amplifier 24 for producing a difference between the respective output voltages of the I/V conversion circuits 20a and 20b; a differential amplifier 25 for producing a difference of the sum of the respective outputs of the I/V conversion circuits 20a and 20b from a bias voltage applied thereto from a bias voltage generation circuit 26 which produces the bias voltage for making the sum of the respective outputs of the pair of photodetectors 3a and 3b be zero when no ink drop exists in a predetermined detecting region; a switch 27 (SW$_5$) for selectively transferring the output of the differential amplifier 24 to a succeeding circuit portion; a switch 28 (SW$_6$) for selectively transferring the output of the differential amplifier 25 to a succeeding circuit portion; a switch 29 (SW$_4$) for selectively transferring the respective output voltages of the I/V conversion circuits 20a and 20b to the differential amplifier 25; a sampling and holding circuit 30 for sampling and holding the value of the voltage transferred from the switch 27 or 28; an A/D converter 31 for converting an analog voltage sampled and held by the sampling and holding circuit 30 into a digital voltage; a signal processing circuit 32 (constituted, for example, by a microcomputer) for detecting a two-dimensional position of an ink drop on the basis of the output of the A/D converter 31 and for controlling the bias voltage generation circuit 26, the sample and hold circuit 30, and a pair of brightness adjusting circuits 33 and 35 which change respective resistance values of feedback resistors R provided in the I/V conversion circuits 20a and 20b in response to the instructions from the signal processing circuit 32; a first photocoupler 34 constituted by a light emission diode 34a in which the light emission thereof is controlled by the brightness adjusting circuit 33, and a light reception element 34b in which the resistance value thereof varies in accordance with the amount of light reception from the light emission diode 34a and which serves also as the feedback resistor R$_f$ of the A/D conversion circuit 20a; and a second photocoupler 36 constituted by a light emission diode 36a in which the light emission thereof is controlled by the brightness adjusting circuit 35, and a light reception element 36b in which the resistance value thereof varies in accordance with the amount of light reception from the light emission diode 36a and which serves also as the feedback resistor R$_f$ of the A/D conversion circuit 20b.

Figure 2:
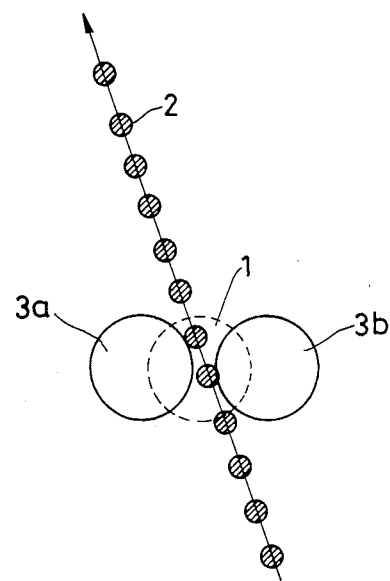
FIG. 2 is a diagram showing a flying pattern of ink drops in the two-dimensional position detecting apparatus according to the present invention.
Figure 3:
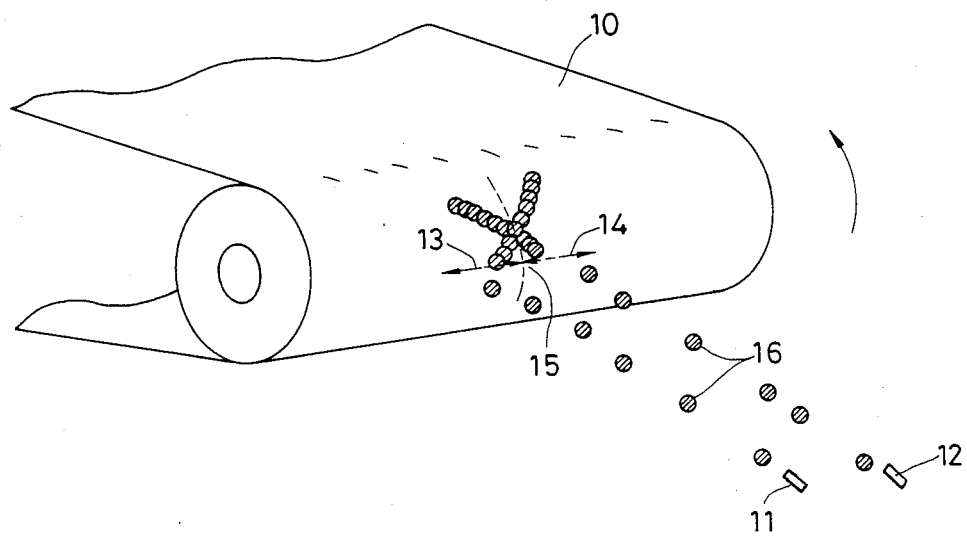
FIG. 3 is a diagram for explaining a stitching operation in an ink jet system recording apparatus of the multi-nozzle type.

In the arrangement as described above, the respective photocurrents produced in the pair of photodetectors 3a and 3b are converted into voltages by the I/V conversion circuits 20a and 20b respectively. Assume now that ink drops are caused to successively and continuously fly to pass over the pair of photodetectors 3a and 3b as shown in FIG. 2, thereby causing the respective resistance values of the feedback resistors R$_f$ (the light reception elements 34b and 36b) to vary in accordance with the respective outputs of the pair of photodetectors 3a and 3b. In this case, each of the respective outputs of the pair of photodetectors 3a and 3b is reduced by a value corresponding to the total amount obtained by integrating contribution the shadows due to the successive ink drops with respect to the time. This total amount is sufficiently large in comparison with a contribution by an individual drop, so that an output of a DC level can be detected. In this case, the relationship between the difference in output between the respective photodetectors 3a and 3b and the passing position of the ink drops as well as the relationship between the sum of the outputs and the passing position of the same are the same as those shown in FIGS. 6 and 8 respectively.

Next, a description will be given as to a procedure for detecting a two-dimensional position of ink drops.

(1) First, ink drops are caused to successively and continuously fly to pass outside the detecting region of the detecting unit.

(2) Next, the switch 37 is closed or turned on while the other switches are opened or turned off, and an output voltage of the I/V conversion circuit 20a is subject to sampling/holding and A/D conversion through the differential amplifier 24 to produce a digital output. The digital output is in turn read by the signal processing circuit 32. The signal processing circuit 32 controls the brightness adjusting circuit 33 to make the above-mentioned digital output be a predetermined value, thereby adjusting the resistance value of the feedback resistor $R_f$ by the photocoupler 34.

(3) Succeeding the process step (2), the switches 21, 22 and 27 are closed while the other switches are opened, so that an output voltage of the I/V conversion circuit 20b is derived through the differential amplifier 24. Similarly to the processing in the process step (2), the brightness adjusting circuit 35 is controlled, so that the resistance value of the feedback resistor $R_f$ is adjusted by the photocoupler 34 to thereby set the output of the differential amplifier 24 to a predetermined value.

(4) Next, ink drops are caused to successively and continuously fly through the detecting region of the detecting unit.

(5) Thereafter, the switches 21, 22 and 27 are closed while the other switches are opened so that the respective output voltages $V_1$ and $V_2$ of the I/V conversion circuits 20a and 20b are applied to the differential amplifier 24 to thereby cause the differential amplifier 24 to produce a difference $(-V_1+V_2)$ in output between the I/V conversion circuits 20a and 20b. Then, the passing positions of ink drops in the X-direction are controlled so as to set the output difference to a predetermined value.

(6) After the foregoing operation of the process step (5), ink drops are caused to successively and continuously fly outside the detecting region of the detecting unit.

(7) Next, the switches 23, 29, and 28 are closed while the other switches are opened so that the sum $(V_1+V_2)$ of the respective output voltages of the I/V conversion circuits 20a and 20b is applied to the differential amplifier 25 through the switch 29. The output voltage of the differential amplifier 25 is subject to sampling/holding and A/D conversion to thereby produce a digital output which is in turn read by the signal processing circuit 32.

Here, the bias voltage produced by the bias voltage generation circuit 26 is controlled by the signal processing circuit 32 so that the output voltage from the differential amplifier 25 becomes zero, and the value of the bias voltage when the output voltage of the differential amplifier 25 has become zero is stored in a memory incorporated in the signal processing circuit 32.

(8) Further, ink drops are caused to successively and continuously fly so as to pass through the passing positions obtained by the operation of the process step (5).

(9) Next, the output voltage of differential amplifier 25 is read into the signal processing circuit 32 so that the signal processing circuit 32 produces the passing positions in the Z-direction on the basis of a ratio of the output voltage of the differential amplifier 25 to the bias voltage.

Thus, it is possible to detect the two-dimensional positions of ink drops by the processing procedure, and it is possible to perform position control of ink drops on the basis of the result of this two-dimensional position detection.

As described above, in the two-dimensional position detecting apparatus for ink drops according to the present invention, the horizontal position of ink drops is detected on the basis of a difference in output between a pair of photodetectors while the vertical position of the ink drops is detected on the basis of the sum of the same outputs, so that it is possible to detect the two-dimensional position of ink drops by the provision only of a light source and two photodetector sensors, so that it is possible to simplify the arrangement of the two-dimensional position detecting apparatus.

It will be obvious to those skilled in the art that many modifications may be made within the scope of the present invention without departing from the spirit thereof, and the invention includes all such modifications.

What is claimed is:

1. In an ink jet system recording apparatus comprising at least one nozzle so that recording is performed while controlling charges on ink drops discharged from said nozzle, a two-dimensional position detecting apparatus for ink drops comprising:

a single light source means and a pair of photodetector means disposed in a detecting region;

said pair of photodetector means being sufficiently close that a single ink drop, passing in a space between said single light source and said pair of photodetector means, can cast a shadow simultaneously upon said pair of photodetector means; the ink drop casting a shadow having a size in proportion to the proximity of the ink drop to said single light source means; said pair of photodetector means respectively producing electrical signals corresponding to light falling on said pair of photodetector means from said single light source means; the amount of light falling upon said pair of photodetector means being affected by a flying position of said ink drops in said detecting region; and a single processing means for detecting a horizontal position of an ink drop on the basis of a difference in said electrical signals between said pair of photodetector means, and for detecting a vertical position of the same ink drop on the basis of the sum of said respective electrical signals of said pair of photodetector means.

2. The system according to claim 1 wherein said pair of photodetector means comprises two photodetectors for generating first and second output voltage signals, respectively.

3. The system according to claim 2 wherein said signal processing means comprises first means for producing a difference signal representing the difference between said first and second output voltage signals.

4. The system according to claim 3 wherein said first means for producing comprises a differential amplifier.

5. The system according to claim 3 wherein said signal processing means further comprises:

bias voltage generation circuit for producing a bias voltage;

second means for producing a sum signal representing the sum of said first and second output voltage signals; and third means for producing a difference signal representing the difference between said sum signal and said bias voltage.

6. The system according to claim 5 wherein said third means for producing comprises a differential amplifier.

7. The system according to claim 5 further comprising a signal processing circuit for controlling said bias voltage generation circuit.

* * * * *